(12) United States Patent
Bollich

(10) Patent No.: US 7,076,488 B2
(45) Date of Patent: Jul. 11, 2006

(54) XML-LDAP ADAPTERS AND METHODS THEREFOR

(75) Inventor: Brooks Bollich, Fort Collins, CO (US)

(73) Assignee: Hewlett-Packard Development Comapny, L.P., Houston, TX (US)

( * ) Notice: Subject to any disclaimer, the term of this patent is extended or adjusted under 35 U.S.C. 154(b) by 465 days.

(21) Appl. No.: 10/354,488

(22) Filed: Jan. 29, 2003

(65) Prior Publication Data

US 2004/0148305 A1 Jul. 29, 2004

(51) Int. Cl.
*G06F 17/30* (2006.01)

(52) U.S. Cl. ............ 707/10; 707/102; 707/103 R; 707/104.1; 709/213; 709/229; 715/513

(58) Field of Classification Search .......... 707/3, 707/10, 100, 101, 104.1, 1, 103 R, 102; 709/213, 709/223, 218, 229; 715/513
See application file for complete search history.

(56) References Cited

U.S. PATENT DOCUMENTS

| | | | | |
|---|---|---|---|---|
| 6,052,681 | A * | 4/2000 | Harvey | 707/3 |
| 6,085,188 | A * | 7/2000 | Bachmann et al. | 707/3 |
| 6,161,008 | A * | 12/2000 | Lee et al. | 455/415 |
| 6,175,836 | B1 * | 1/2001 | Aldred | 707/103 R |
| 6,345,266 | B1 * | 2/2002 | Ganguly et al. | 707/1 |
| 6,347,312 | B1 * | 2/2002 | Byrne et al. | 707/3 |
| 6,356,892 | B1 * | 3/2002 | Corn et al. | 707/3 |
| 6,366,913 | B1 * | 4/2002 | Fitler et al. | 707/9 |
| 6,585,778 | B1 * | 7/2003 | Hind et al. | 715/513 |
| 6,609,121 | B1 * | 8/2003 | Ambrosini et al. | 707/3 |
| 6,611,837 | B1 * | 8/2003 | Schreiber | 707/100 |
| 6,718,371 | B1 * | 4/2004 | Lowry et al. | 709/213 |
| 6,772,206 | B1 * | 8/2004 | Lowry et al. | 709/223 |
| 6,792,416 | B1 * | 9/2004 | Soetarman et al. | 707/3 |
| 6,871,220 | B1 * | 3/2005 | Rajan et al. | 709/218 |
| 6,901,410 | B1 * | 5/2005 | Marron et al. | 707/104.1 |
| 6,959,336 | B1 * | 10/2005 | Moreh et al. | 709/229 |
| 6,983,288 | B1 * | 1/2006 | Kirkwood et al. | 707/103 R |

OTHER PUBLICATIONS

Law, K.L. Eddie, "XML on LDAP Network Database", IEEE, 2000 Canadian Conference on Electrical and Computer Engineering, vol. 1, Mar. 7-10, 2000, pp. 469-473.*

(Continued)

*Primary Examiner*—Shahid Alam

(57) ABSTRACT

An arrangement for transforming data between an XML (extensible markup language) data source and an LDAP (Lightweight Directory Access Protocol) interface is disclosed. The arrangement includes a XML-LDAP adapter for transforming first data into second data. The first data is represented in a first XML format and includes information pertaining to at least a subset of third data. The third data represents an XML-formatted message received from the XML data source. The second data is represented in a LDAP format and pertains to an LDAP operation affecting an LDAP directory that is coupled to receive the second data through the LDAP interface, whereby the LDAP operation is represented by an operation object that implements both a first functionality and a second functionality. The first functionality executes the LDAP operation. The second functionality restores the LDAP directory to a state that existed prior to a commencement of execution of the operation object.

32 Claims, 6 Drawing Sheets

OTHER PUBLICATIONS

King, Nelson, "Balancing XML and LDAP", Computer Technology Trends & Tools.com, Sep. 12, 2000, pp. 1-3.*

Tidewell, Doug, "Accessing LDAP Data with XML", Infoloom.com, Nov. 1998, pp. 1-6.*

* cited by examiner

```
<?xml version="1.0" encoding="UTF-8"?>

<!DOCTYPE LDAP SYSTEM "LDAP.dtd">

<LDAP>
   <Security>
      <Attribute name="SECURITY_PROTOCOL" value=""/>
      <Attribute name="SECURITY_AUTHENTICATION" value="simple"/>
      <Attribute name="SECURITY_PRINCIPAL" value="cn=Manager,dc=myidc,dc=com"/>
      <Attribute name="SECURITY_CREDENTIALS" value="secret"/>
   </Security>

<AddEntry dn="uid=ckramer,o=yourorg,dc=myidc,dc=com" >
      <Attribute name="objectClass" value="inetOrgPerson"/>
      <Attribute name="cn" value="Cosmo"/>
      <Attribute name="sn" value="Kramer"/>
      <Attribute name="uid" value="ckramer"/>
      <Attribute name="userPassword" value="giddyup"/>
   </AddEntry>
</LDAP>
```

Fig. 7

XML-LDAP ADAPTERS AND METHODS THEREFOR

BACKGROUND OF THE INVENTION

LDAP (Lightweight Directory Access Protocol) has been around for some time. The LDAP specification (RFC 2251, www.ietf.org) can be employed, as an exemplary application, to implement read-heavy databases or directories, wherein stored directory entries can be looked up quickly.

An example of a typical LDAP directory is a human resource (HR) directory wherein each entry may represent an employee record. LDAP entry objects have attributes. In the case of the HR directory example, the employee's last name, first name, email address, salary, home address, and phone number may represent various attributes of an entry. Each LDAP entry is uniquely identified by a distinguished name (DN), which is a unique identifier for each LDAP entry. Generally speaking, the distinguished name (DN) can be any string of characters. For example, the employee's email address may be employed as a DN since no two employees can validly have the same email address.

LDAP systems are typically accessed using a directory client, which is a front-end program for furnishing information to the LDAP server in order to enable the LDAP server to perform the LDAP operations. Through the use of a directory client, a user may, for example, add an entry, remove an entry, or modify an entry. The aforementioned three LDAP operations (e.g., add, remove, and modify) tend to constitute the bulk of the operations required in LDAP directory update and maintenance (referred to herein generically as LDAP update). These three LDAP operations are also operations most frequently involved in LDAP server provisioning (i.e., automated activities with an LDAP server to perform LDAP directory update and maintenance). With respect to the HR example above, a directory client may be employed to communicate with the LDAP server to add a batch of new employee entries into the LDAP directory, to remove one or more employees from the LDAP directory, or to modify information pertaining to one or more employees.

To allow the front-end directory client to exchange information with the LDAP server, there is a need to transform the directory client data into data conformant to the LDAP protocol, which may then be employed by the LDAP server to perform the necessary LDAP operations.

Some implementations of the LDAP specification employ LDIF (LDAP directory information format) as a directory update mechanism. Generally speaking, LDIF is a file format for representing LDAP directory information. Using LDAP server specific commands from the UNIX command line that refers to LDIF text files, for example, certain automation of LDAP server provisioning (e.g., populating a directory) may be achieved. LDIF is defined in RFC 2849 (www.ietf.org).

The LDIF format, however, is specifically designed for the LDAP protocol and is not widely used by front-end directory client programs. For example, it is believed that there are no customer relationship management (CRM) programs in existence that employs LDIF to represent data. Accordingly, there tends to be a substantial amount of work involved in interfacing LDAP servers to directory front-end programs when LDIF is employed as an intermediary.

SUMMARY OF THE INVENTION

The invention relates, in one embodiment, to an arrangement for transforming data between an XML (extensible markup language) data source and an LDAP (Lightweight Directory Access Protocol) interface. The arrangement includes a XML-LDAP adapter for transforming first data into second data. The first data is represented in a first XML format and includes information pertaining to at least a subset of third data. The third data represents an XML-formatted message received from the XML data source. The second data is represented in a LDAP format and pertains to an LDAP operation affecting an LDAP directory that is coupled to receive the second data through the LDAP interface, whereby the LDAP operation is represented by an operation object that implements both a first functionality and a second functionality. The first functionality executes the LDAP operation. The second functionality restores the LDAP directory to a state that existed prior to a commencement of execution of the operation object.

In another embodiment, the invention relates to a method for transforming data between an XML (extensible markup language) data source and an LDAP (Lightweight Directory Access Protocol) interface. The method includes receiving first data, the first data pertaining at least to a subset of first information received from the XML data source. The method includes creating an operation object using the first data. The method further includes transforming information associated in the operation object into second data, the second data having an LDAP format and pertaining to an LDAP operation that affects an LDAP directory coupled to receive the second data through the LDAP interface, whereby the operation object implementing both a first functionality and a second functionality. The first functionality executes the LDAP operation. The second functionality restores the LDAP directory to a state that existed prior to a commencement of execution of the operation object.

In yet another embodiment, there is provided an arrangement for transforming data between an XML (extensible markup language) data source and an LDAP (Lightweight Directory Access Protocol) interface. The arrangement includes means for receiving first data from the XML data source, the first data being represented in a first XML format. The arrangement further includes means for transforming first information associated with the first data into second data. The second data is represented in an LDAP format and pertains to an LDAP operation affecting a LDAP directory that is coupled to receive the second data through the LDAP interface, whereby the LDAP operation is represented by an operation object that implements both a first functionality and a second functionality. The first functionality executes the LDAP operation. The second functionality restores the LDAP directory to a state that existed prior to a commencement of execution of the operation object.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 7 shows exemplary XML code for adding an LDAP entry in an exemplary LDAP system in accordance with one embodiment of the present invention.

DETAILED DESCRIPTION OF THE PREFERRED EMBODIMENTS

Figure 1:
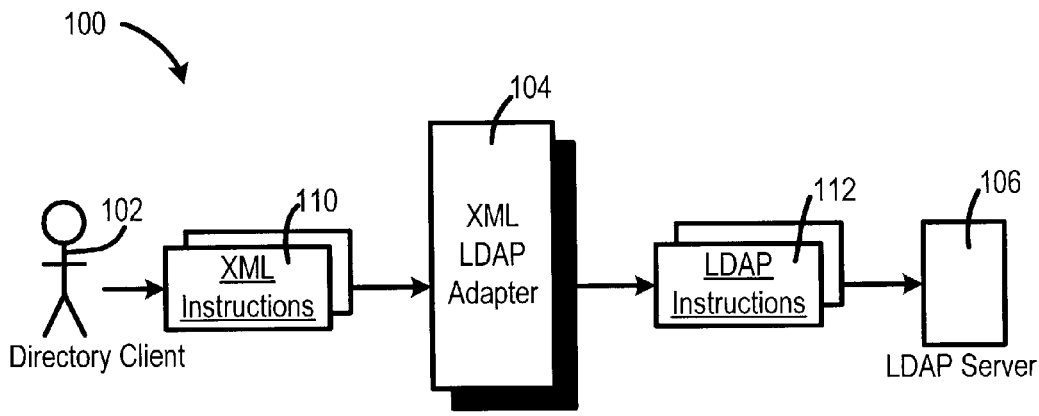
FIG. 1 shows, in accordance with one embodiment of the present invention, an exemplary LDAP system implementing the inventive XML-LDAP adapter.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one embodiment of the present invention, there is provided a XML-LDAP adapter for interfacing between an LDAP protocol interface (such as an LDAP server) with a XML data source. In one embodiment, the inventive XML-LDAP adapter further supports both execute and rollback operations on an LDAP server, allowing the adapter to plug directly into external transaction engines requiring such capabilities. Additionally or alternatively, the inventive XML-LDAP adapter allows for operations independent of specific LDAP schemas, thereby allowing the use of any object class and/or LDAP entry attribute that can be defined on the LDAP server.

It is recognized by the inventor herein that XML has become the data transport mechanism of choice for many potential LDAP directory clients. In fact, XML is quickly becoming the standard text data representation format. Beside sheer popularity, XML has many technical advantages over LDIF for LDAP applications, including the ability to represent data in a manner that is language-independent and/or platform-independent. XML data can also be transformed with relative ease from one XML implementation to another XML implementation using, for example, the XSLT (Extensible Stylesheet Language Transformation) mechanism.

Many important classes of LDAP directory clients already employ XML as their standard data representation format. For example, a vast number of customer relationship management (CRM) programs already employ XML data. Other XML data sources routinely find use as LDAP directory clients. Accordingly, the ability of an adapter to couple an LDAP protocol interface to a XML data source without requiring the use of the LDIF format represents a significant reduction in complexity and cost in implementing an LDAP system.

Furthermore, external transaction engines often require both the execute and the rollback capabilities. As the term is employed herein, a transaction engine is a program employed to decompose a high-level request from a front-end directory client into a number of atomic operations that can be executed serially or concurrently to accomplish the high-level request. A transaction may comprise the execution of many atomic LDAP operations. When one of the operations or any step in the transaction fails, many LDAP systems require that the transaction be rolled back so that the LDAP system is placed in the state that existed prior to commencement of the transaction that failed. The inventive XML-LDAP adapter employs inventive techniques to efficiently support both the execution and rolling back of operations in a transaction.

The features and advantages of the present invention may be better understood with reference to the discussions and figures that follow. FIG. 1 shows, in accordance with one embodiment of the present invention, an exemplary LDAP system 100 including a directory client 102, a XML-LDAP adapter 104, and an LDAP server 106. FIG. 1 illustrates the directory client to LDAP server communication sequence.

Directory client 102 represents the front-end program for obtaining the LDAP update data to perform the LDAP directory update task. In the aforementioned HR example, directory client 102 may represent the program for furnishing data regarding new employees, employees to be removed, and/or updated attribute data regarding an existing employee, which data is required to perform the LDAP update operations (e.g., add an employee, remove an employee, or update an employee entry). In FIG. 1, directory client 102 employs XML and thus outputs one or more XML instructions (110) to XML-LDAP adapter 104. XML LDAP adapter 104 translates the XML instructions into LDAP instructions 112 conformant with the LDAP protocol, typically in the form of LDAP objects. LDAP server 106 represents the server interacting with the LDAP directory and is responsible for carrying out LDAP instructions 112 to accomplish the LDAP directory update tasks.

Figure 2:
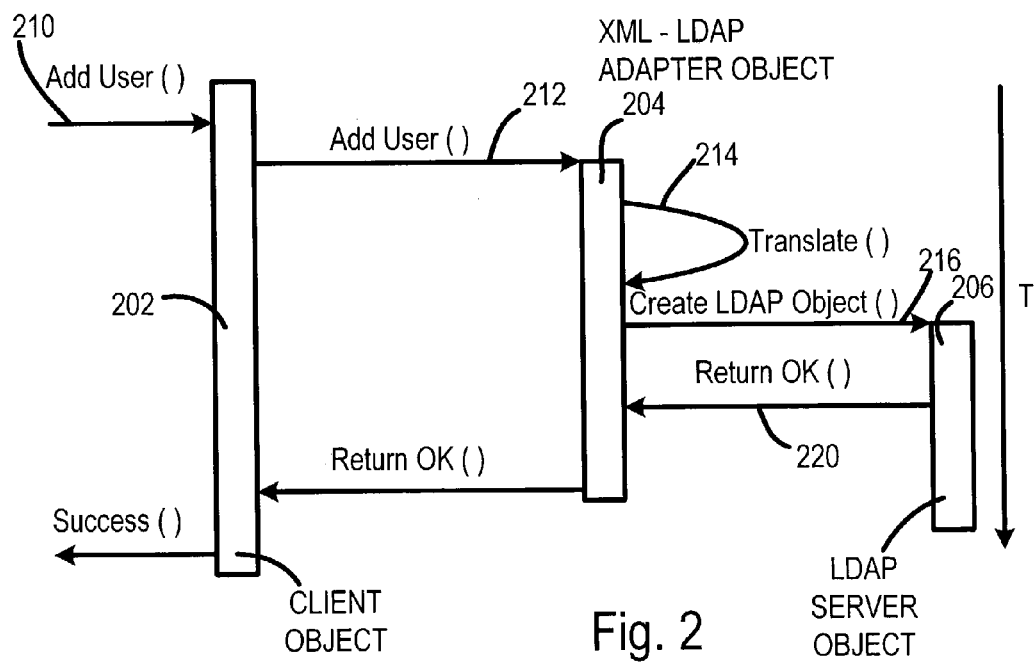
FIG. 2 shows, in accordance with one embodiment of the invention, an exemplary sequence diagram for an "add user" operation.

FIG. 2 shows, in accordance with one embodiment of the invention, an exemplary sequence diagram for an "add user" operation, which may be employed to, for example, add a user into a user database that is implemented as an LDAP directory. In the example of FIG. 2, there are 3 objects: a client object 202, a XML-LDAP adapter object 204, and an LDAP server (or proxy thereof) object 206. To illustrate the timing sequence, client object 202, XML-LDAP adapter object 204, and LDAP server object 206 act as object lifetime markers in FIG. 2 for the various messages passed from object to object. A later message is positioned lower in FIG. 2 than an earlier message (in the direction of arrow T, for time, as shown).

An add-user( ) message 210 inputted into client object 202, which is then outputted in XML form (212) into XML-LDAP adapter object 204. The XML-LDAP adapter object 204 translates (via arrow 214) the XML-formatted message add-user( ) 212 into an LDAP operation "create LDAP object( )" 216, which is then inputted into LDAP server object 206. Arrow 214 originates at XML-LDAP adapter object 204 and terminates at XML-LDAP adapter object 204 to illustrate that the translation is an internal task performed by XML-LDAP adapter object 204.

If the LDAP operation to add the user into the LDAP directory executes satisfactorily, LDAP server object 206 returns an LDAP-formatted message "ReturnOK( )" 220, which is translated into a XML-formatted message "ReturnOK( )" 222 by XML-LDAP adapter object 204. The XML-formatted message "ReturnOK( )" 222 is then translated into a "success" message 224, which is understood by the calling routine.

Since XML-LDAP adapter object 204 works directly with the XML format and the LDAP format, there is no need to employ LDIF as an intermediary. Accordingly, the aforementioned disadvantages associated with LDIF are avoided entirely. As mentioned, a large number of clients already employ XML as the main data transport mechanism. Since XML can be easily adaptable from one XML format to another XML format (e.g., using XSLT), XML-LDAP adapter object 204 can readily work with a variety of different XML data sources, contributing to the language-independent and platform-independent characteristics of the XML-LDAP adapter and/or reducing the effort and time required to implement an LDAP system. Additionally, the XML-LDAP adapter can communicate with any LDAP protocol interface (such as LDAP server object 206) that conforms to the LDAP protocol. As such, the XML-LDAP adapter is also language-independent and platform-independent at the backend.

Figure 3:
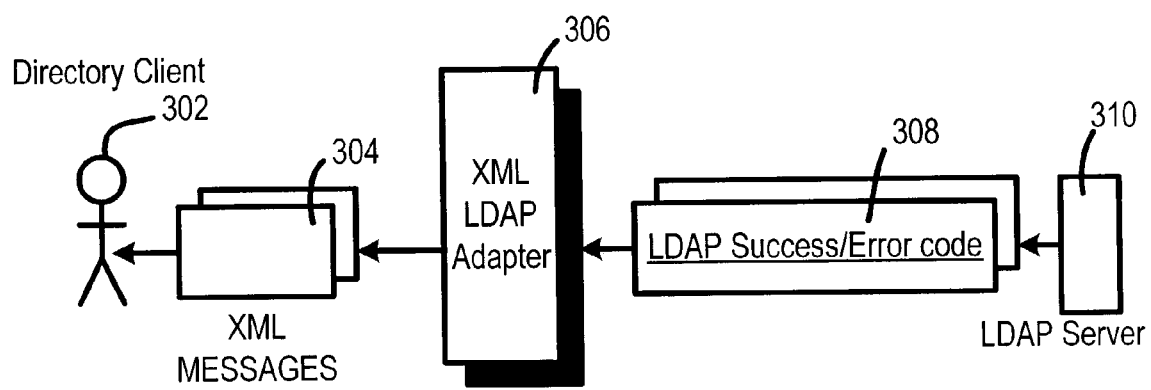
FIG. 3 shows, in accordance with one embodiment of the invention, the sequence diagram for returning success and/or error codes from the LDAP server to the XML data source.

As shown in FIG. 2, the success message returned by the LDAP server may be passed up to the client object to report the success of an operation (or transaction or request). If the LDAP server experiences an error in the execution of one or more operations in a transaction, it may also be important to forward the LDAP-formatted error message to the directory client. FIG. 3 shows, in accordance with one embodiment of the invention, the sequence diagram for returning success and/or error codes from the LDAP server to the XML data source (e.g., client directory 302 in the example of FIG. 3).

In FIG. 3, LDAP server 310 experiences an error condition in the execution of an LDAP operation associated with the request by directory client 302. Accordingly, LDAP server 310 passes the LDAP success/error code 308 back to XML-LDAP adapter 306. Since XML-LDAP adapter 306 is implemented to conform with the LDAP specification and since XML-LDAP adapter 306 has a vocabulary of the success/error codes 308 returned from LDAP server 310, XML-LDAP adapter 306 can translate the success/error code 308 into XML-formatted success/error message(s) 304 to be transmitted to directory client 302. Directory client 302 may then employ the XML-formatted success/error message(s) to update the status of transaction execution, for example.

As mentioned earlier, an important aspect of the inventive XML-LDAP adapter is the ability to plug directly into external transaction engines that require both the execute and the roll-back capabilities for transactions. Also as mentioned, an external transaction engine may be provided to facilitate transaction execution and may include therein the ability to decompose high-level requests such as a XML-formatted request into a number of atomic operations that can be executed serially or concurrently to accomplish a request. With respect to the above-mentioned user directory example, a transaction may represent a transaction request from a CRM program to add 10 users into the LDAP directory, for example. In the above example, if one of the operations in the transaction request fails, the transaction engine typically requires that the LDAP directory be returned to the state that existed before the transaction commenced. For example, if five users can be added but the addition of the 6th user fails, the transaction engine typically requires that the entire transaction be rolled back so that the LDAP system is returned to the state that existed before the transaction that involves adding the 10 users commences.

Figure 4:
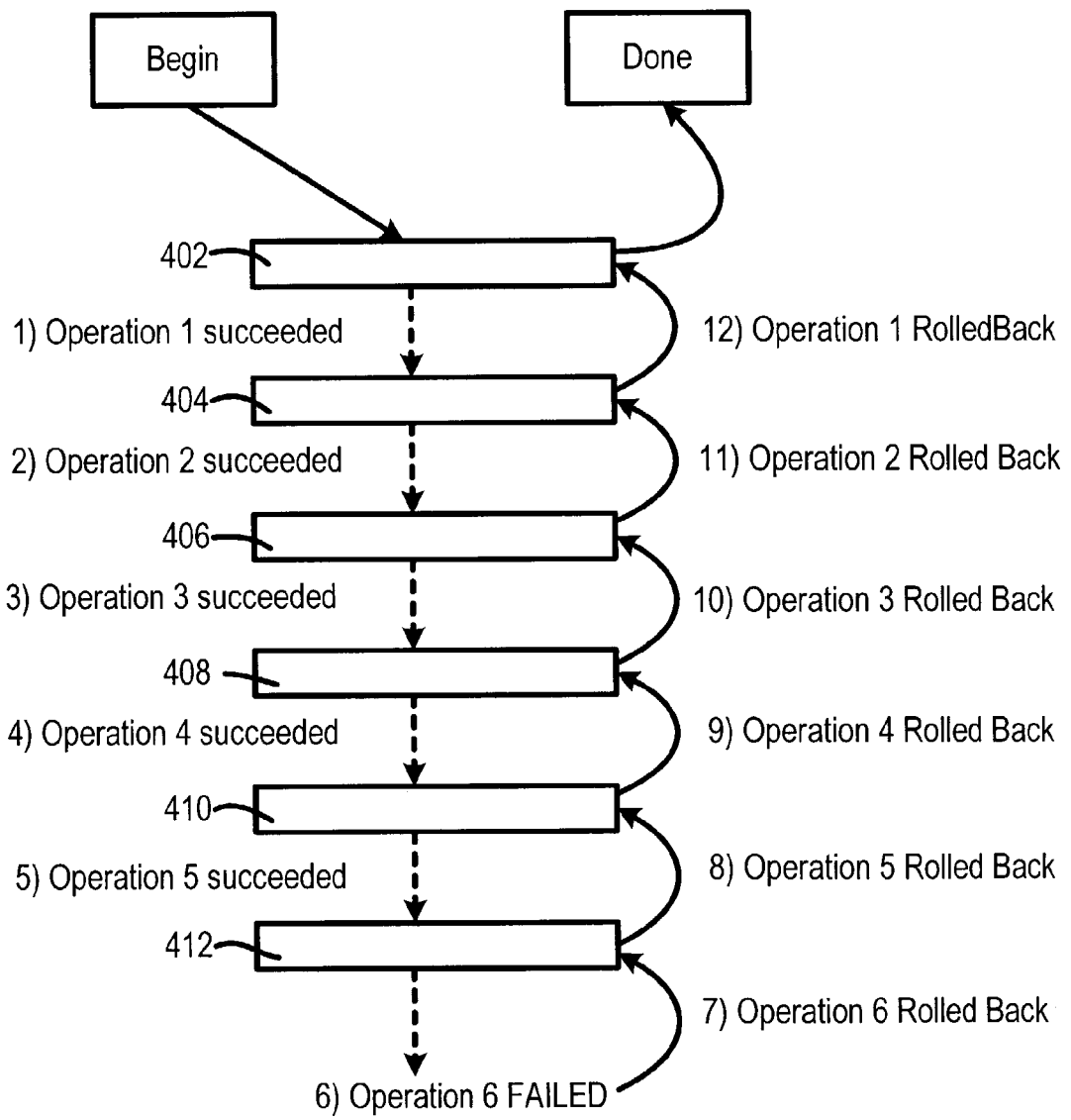
FIG. 4 illustrates, in accordance with one embodiment of the invention, the concept of transaction rollbacks.

FIG. 4 illustrates the concept of transaction rollbacks. When a transaction fails, the XML-LDAP adapter rolls back all operations associated with the failed transaction and returns the LDAP system to the state that existed prior to the commencement of execution of the transaction. Even though FIG. 4 illustrates the concept of rolling back the failed transaction, a rollback of a given transaction may be required even if that transaction executes successfully because in some instances, the failure of a subsequent transaction may require multiple transactions to be rolled back.

In the example of FIG. 4, a transaction having therein a plurality of atomic operations is illustrated. After five successful operations, failure is encountered during the execution of the sixth operation. The LDAP system starts out at state 402. After each successful operation, a new state is reached. Thus, states 404, 406, 408, 410, and 412 are shown for successful operations 1–5. Due to the failure during the execution of the 6th operation, no new state is created after state 412. However, some state parameters may have changed due to the partial execution of the 6th operation and thus some cleanup work may be necessary even though the 6th operation failed.

Accordingly, the first rollback causes the system to return to state 412 that existed after the successful execution of the 5th operation. The operations are successively rolled back until state 402 is reached, thereby returning the LDAP system back to the state that existed prior to the commencement of execution of the transaction. As will be discussed later herein, the XML-LDAP adapter object employs innovative techniques to ensure that each of the three LDAP update operations (add, remove, and modify) can rollback in a manner that allows the XML-LDAP adapter to plug directly into an external transaction engine.

Figure 5:
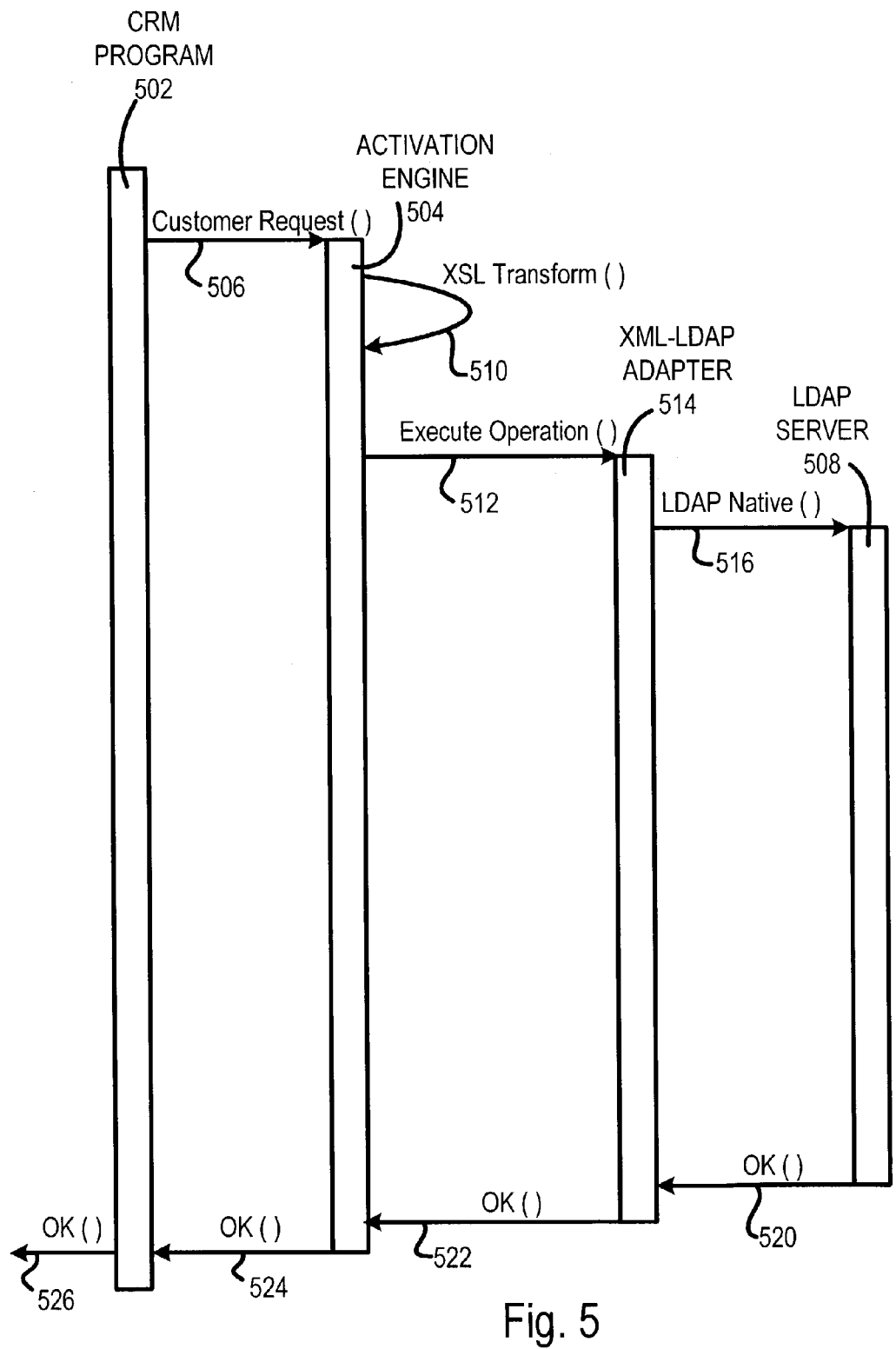
FIG. 5 depicts, in accordance with one embodiment of the invention, an exemplary sequence diagram illustrating an application of the inventive XML-LDAP adapter to service requests from a CRM program.

FIG. 5 depicts, in accordance with one embodiment of the invention, an exemplary sequence diagram illustrating an application of the inventive XML-LDAP adapter to service requests from a CRM program. In the example of FIG. 5, a CRM program 502 may represent a customer relationship management program for interfacing with users to collect customers' information. For example, CRM program 502 may represent a front-end program operated by a network Internet service provider to allow web hosting customers to set up web service. A request to set up a web service may involve a number of transactions, such as the assignment of a particular machine on the server farm, the assignment of a particular IP (Internet Protocol) address, security option set up, and the like. Each of the aforementioned transactions may involve one or more operations to be executed by the LDAP server.

The information regarding a customer's request is obtained by CRM program 502 and transmitted to an activation engine 504 as CustomerRequest( ) 506, which is in the XML format employed by CRM program 502. Activation engine 504 analyzes the XML request 506 from CRM program 502, extracts from the XML request 506 data and commands specific to the LDAP directory, and may perform a transform operation 510 (e.g., via XSL transformation) to transform CustomerRequest( ) 506, which is in the XML format employed by CRM program 502, to a message ExecuteOperation( ) 512 having a XML format tailored for LDAP. Thus, the message ExecuteOperation( ) 512 is also in the XML format, but may be in a XML format that is different from the XML format of CustomerRequest( ) 506.

The XML-formatted message ExecuteOperation( ) 512 is then inputted into XML-LDAP adapter 514, which translates message 512 into an LDAP-specific message LDAPNative( ) 516 to enable LDAP server 508 to execute the requested LDAP operation. If the operation is successful, LDAP server 508 then returns an LDAP-formatted success message 520, which is translated by XML-LDAP adapter 514 into an LDAP-oriented XML success message 522. The LDAP-oriented XML success message 522 is then transformed (e.g., using XSL transformation) into a XML-formatted success message 524 for inputting into CRM program 502. CRM program 502 may optionally pass the information in the XML-formatted success message 524 onto another program as status information, using the XML format or another format.

In the example of FIG. 5, only one operation (512) is illustrated. However, a request from a client directory program (such as by CRM program 502) may involve multiple transactions. In the example of FIG. 5, activation engine 504 may be responsible for decomposing the request from CRM program 502 into multiple transactions. Each transaction may be further decomposed by a transaction engine into atomic operations. With reference to FIG. 5, a transaction engine (not shown) may be interposed between activation engine 504 and XML-LDAP adapter 514 to facilitate the execution of the atomic LDAP operations by LDAP server 508 (via XML-LDAP adapter 514).

Figure 6:
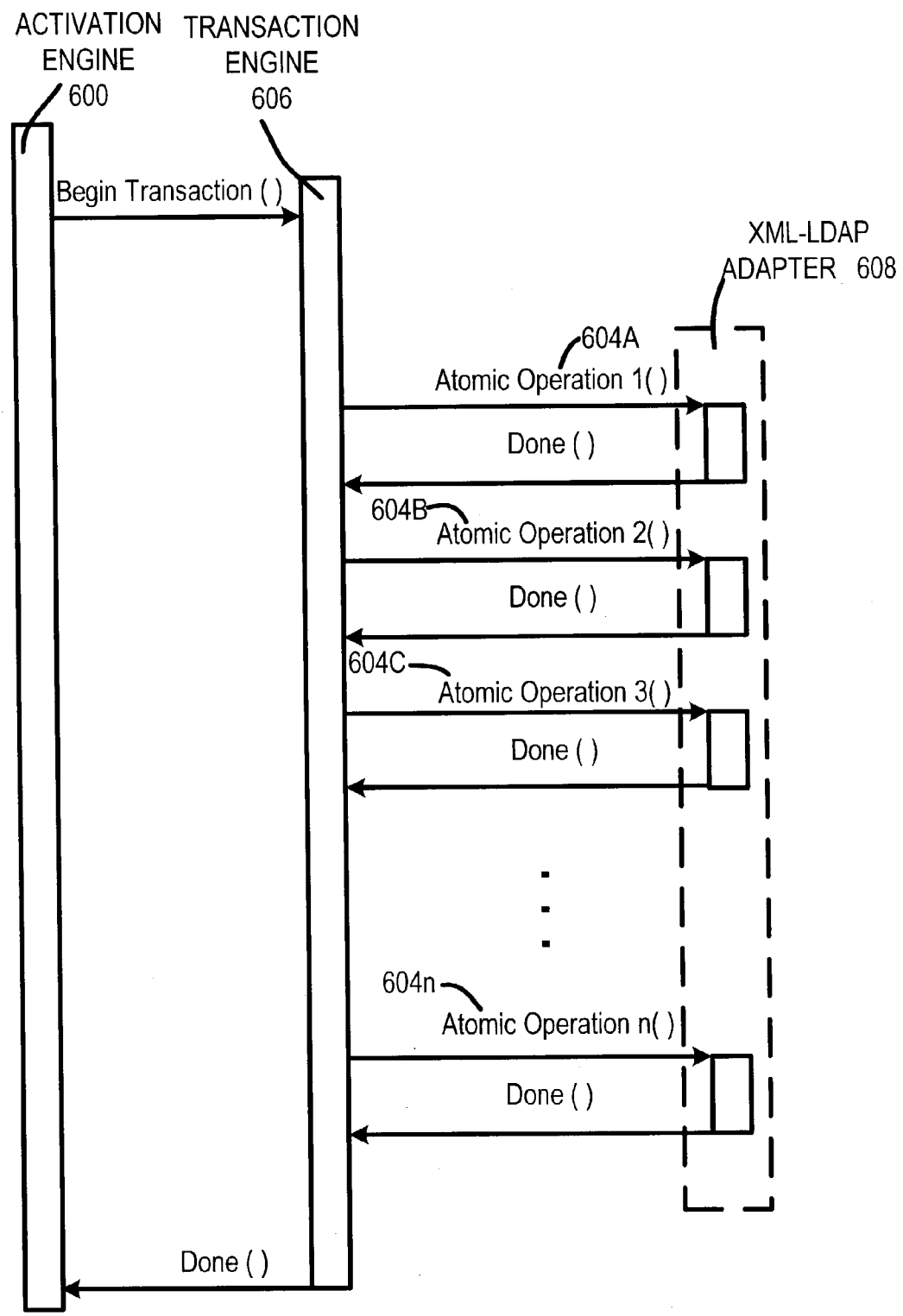
FIG. 6 illustrates, in accordance with one embodiment of the present invention, a sequence diagram wherein a XML transaction request from activation engine is decomposed into a plurality of XML-formatted atomic operation requests.

FIG. 6 illustrates, in accordance with one embodiment of the present invention, a seqhuence diagram wherein a XML transaction request 602 from activation engine 600 is decomposed into a plurality of XML-formatted atomic operation requests 604A–604N, which are then translated by the XML-LDAP adapter into LDAP operations for execution by the LDAP server (not shown).

In FIG. 5, each XML-formatted command decomposed by transaction engine 606 is forwarded to XML adapter 608 for translation into an LDAP-formatted operation to be forwarded onto the LDAP server. As shown in FIG. 5, transaction engine 606 and XML-LDAP adapter 608 are decoupled in that communication between transaction engine 606 and XML-LDAP adapter 608 is accomplished via a series of XML-formatted atomic operation messages 604A–604N from transaction engine 606 to XML-LDAP adapter 608 and a corresponding series of XML-formatted success/error messages from XML-LDAP adapter 608 to transaction engine 606. FIG. 5 shows the situation wherein all operations are successfully executed by the LDAP server.

If an error occurs with any of operations 604A–604N, XML-LDAP adapter 608 will receive an error message from the LDAP server in the manner discussed earlier and will roll back all operations already executed, including the failed operation. After the roll back, the LDAP system is returned to the state that existed before the commencement of the atomic operations associated with message 604A.

The error message forwarded from XML-LDAP adapter 608 to transaction engine 606 (which error message may be forwarded up the chain by transaction engine 606) signifies that one of the operations associated with the request 602 by activation engine 600 has failed. Due to the decoupling between transaction engine 606 and XML-LDAP adapter 608, transaction engine 606 simply knows that the transaction fails. Any operation already executed will be rolled back by XML-LDAP adapter 608. In other words, transaction engine 606 is decoupled from the knowledge regarding the LDAP operations actually performed and the steps required to roll back the LDAP operations if there is an error. This decoupling aspect advantageously contributes to the ability of the XML-LDAP adapter of the present invention to be plugged directly into any transaction engine that requires both the ability to execute a transaction in terms of one or more atomic operations and the ability to roll back the entire transaction.

With respect to security, the XML-LDAP adapter may be configured for multiple security configurations for the LDAP connection management (e.g., between the XML-LDAP adapter and the LDAP server, for example). FIG. 7 shows exemplary XML code for adding an LDAP entry in an exemplary LDAP system. Note that the implementation of FIG. 7 is only exemplary, and other implementations may exist.

With reference to FIG. 7, both connection and authentication methods may be defined within the XML <Security> tag, for example. For simplicity, the XML-LDAP adapter security options may be patterned after the security mechanisms supported by the LDAP specification if desired. These security options may include, for example, no security, simple authentication, or strong authentication (e.g., certificate-based). The LDAP connections themselves may be accomplished via clear text or via encrypted data via a SSL (Security Socket Layer) mechanism, for example.

In one embodiment, XML messages can be translated into LDAP commands using Java (available from Sun Microsystems, Inc. of Mountain View, Calif.) and the JDNI (Java Naming and Directory Interface) mechanism. In the example of FIG. 7, the information needed to allow JNDI to make a connection to an LDAP server is shown (assuming the host name was provided in advance). For LDAP connections using JNDI, ajavax.naming.directory.DirContext object may be created by passing the security attributes in the <Security> tag (shown in FIG. 7) as well as the host name to a context factory. The context created is then employed as a gateway for all future LDAP operations pertaining to that LDAP server.

FIG. 7 also shows the information needed to create the LDAP entry (e.g., DN, required attributes, optional attributes, etc.). To add the user ckramer in the example of FIG. 7, the information in the <AddEntry> tag is used to create a set of javax.naming.directory.Attribute objects. These objects map directly to the LDAP entry attributes since they will appear in the directory itself.

To add the new entry, the following method may be executed on the context object: dirContext.createSubcontext (dn, entryAttributes). In this case, a new DN is communicated to the LDAP directory for the directory entry add operation.

The other two LDAP update operations, i.e., remove entry and modify entry) may be treated similarly, except that specific semantics associated with state keeping would differ. State keeping using the operation objects is discussed later herein.

In accordance with one embodiment of the invention, there are provided innovative techniques for efficiently accomplishing the roll back operation for each of the three LDAP update operations (i.e., add an LDAP entry, remove an LDAP entry, and modify an LDAP entry). In one embodiment, each of the objects implementing each of the aforementioned LDAP update operations is responsible for storing existing state data (i.e., data needed to undo the operation) and for providing the "undo" functionality. Thus, the object implementing the "add LDAP entry" operation includes both the functionality to add an LDAP entry and the functionality to remove an LDAP entry. Advantageously, the remove functionality is the same functionality provided by the "do" part of the object employed to remove an LDAP entry. Conversely, the add functionality that is employed to "undo" a remove entry operation is the same functionality provided by the "do" part of the object employed to add an LDAP entry.

As an example, an object to add an employee into the LDAP directory would include both the functionality to add the new DN, the employee name attribute, the employee email attribute, and the employee phone number attribute. That object also includes, in the same object, the functionality to remove the DN and attributes associated with the employee name, the employee email, and the employee phone number. The object employed to remove an employee from the LDAP directory would include the functionality to remove the DN and attributes associated with the employee name, the employee email, and the employee phone number, as well as the functionality to add the DN, the employee name attribute, the employee email attribute, and the employee phone number attribute.

Prior to performing an add entry operation, a "snapshot" of the attribute data (and the DN) associated with the add entry operation is taken and the state data is stored in the add entry object itself. When it comes time to roll back that add entry operation, the same object is called again, except that the remove functionality is employed instead. Since the object has the snapshot data stored internally, it simply causes the removal of the LDAP entry having the same data as that internally stored in the object.

Similarly, prior to performing a remove entry operation, a snapshot of the attribute data associated with the remove entry operation is taken and the state data is stored in the remove entry object itself. When it comes time to roll back that remove entry operation, the same object is called again, except that the add entry functionality is employed instead. Since the object has the snapshot data stored internally, it simply adds back an LDAP entry having the same data as that stored internally in the object.

With respect to the modify operation, a snapshot of the existing data is taken prior to modification and stored in the modify object itself. If the modify operation needs to be rolled back, the modify functionality is employed again, except that the data to be "updated" is the snapshot data internally stored. In this manner, the entry is restored using the data that existed in that entry prior to modification, which data is stored in the modify object.

A simple mechanism is thus provided for restoring the state of the LDAP directory back to the state that existed prior to the start of an operation. In fact, the invention facilitates the restoration of the LDAP directory back to the state that exists before the start of a transaction. The transaction engine simply specifies the operations to be undone and the order (i.e., the reverse order of operation execution in the transaction to be undone), and each operation object handles the "undo" function by itself using the state data internally stored. In this manner, the operation objects can be queued individually by the transaction engine without requiring the transaction engine to know about the details of how to undo an operation. Further, by storing the snapshot state data in the operation object and providing both "do" and "undo" functionalities in the operation object, state keeping across operations in a transaction is advantageously simplified. This is further simplified when only one operation is defined per XML file.

It is important to point out that the XML-LDAP adapter can communicate data defined in any valid LDAP schema (including any custom schema) which allows for any object class or LDAP entry attribute that can be defined on the server. Generally speaking, schemas define object hierarchies, e.g., which object can contain other objects, which object contains which attributes, and the like. For example, a schema may specify that an organization object may contain employee objects, and an employee object may contain an employee phone number. An LDAP administrator can create custom schemas in which custom hierarchies and attribute definitions are specified. The aforementioned LDAP RFC 2251, for example, specifies the requirements for a valid schema.

Since the XML-LDAP adapter herein conforms to the LDAP specification, the XML to LDAP transformation (and vice versa) can flexibly accommodate any valid LDAP schema, including any custom LDAP schema. Advantageously, there is open-ended flexibility with regard to the specifics of an LDAP directory's schema. As long as the LDAP schema is valid, the XML-LDAP adapter can be employed.

As can be appreciated from the foregoing, the invention advantageously provides a simple adapter mechanism for interfacing an LDAP protocol interface (such as an LDAP server) with any XML data source (such as a CRM program). By supporting both the execute and rollback functionalities in a manner that is decoupled from the transactional logic of a transaction engine, the XML-LDAP adapter can be plugged directly into external transaction engines that require the abilities to "do" and "undo" operations. Since the existing state data and the "undo" functionality are kept with the operation object, state keeping across operations of a transaction is advantageously simplified. Additionally or alternatively, the inventive XML-LDAP adapter allows for operations independent of specific LDAP schemas, thereby allowing the use of any object class and/or LDAP entry attribute that can be defined on the LDAP server.

While this invention has been described in terms of several preferred embodiments, there are alterations, permutations, and equivalents which fall within the scope of this invention. For example, although some examples herein are discussed in the activation context, the inventive XML-LDAP adapter may be employed in any situation that requires interfacing XML data source with an LDAP protocol interface and that does not require a search or query capability. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An apparatus for transforming data between an XML (extensible markup language) data source and an LDAP (Lightweight Directory Access Protocol) interface, comprising:
   a XML-LDAP adapter for transforming first data into second data, said first data being represented in a first XML format and includes information pertaining to at least a subset of third data, said third data representing an XML-formatted message received from said XML data source, said second data being represented in a LDAP format and pertaining to an LDAP operation affecting an LDAP directory that is coupled to receive said second data through said LDAP interface,
   whereby said LDAP operation is represented by an operation object that implements both a first functionality and a second functionality, said first functionality executing said LDAP operation affecting said LDAP directory, said second functionality restoring said LDAP directory to a state that existed prior to a commencement of execution of said operation object.

2. The apparatus of claim 1 wherein said XML data source represents an LDAP directory front-end program.

3. The apparatus of claim 2 wherein said LDAP directory front-end program represents a customer relationship management (CRM) program.

4. The apparatus of claim 1 wherein said operation object represents one of an add entry object, a remove entry object, and a modify entry object.

5. The apparatus of claim 4 wherein said first functionality represents an add entry functionality and said second functionality represents a remove entry functionality.

6. The apparatus of claim 4 wherein said first functionality represents a remove entry functionality and said second functionality represents an add entry functionality.

7. The apparatus of claim 4 wherein said first functionality represents a first modify entry functionality configured to modify an entry in said LDAP directory from a first state to a second state, said second functionality represents a second modify entry functionality configured to modify said entry from said second state back to said first state.

8. The apparatus of claim 4 wherein said operation object is configured to store state data associated with said LDAP operation, said state data representing data to enable said second functionality to accomplish said restoring said LDAP directory to said state that existed prior to said commencement of execution of said operation object.

9. The apparatus of claim 4 further comprising an activation engine for transforming said third data into fourth data, said fourth data having a second XML format different from said first XML format.

10. The apparatus of claim 9 wherein said transforming said third data into said fourth data employs XSLT technology.

11. The apparatus of claim 9 further comprising a transaction engine for decomposing said fourth data into a plurality of messages, each of said plurality of messages being associated with an LDAP atomic operation, one of said plurality of messages being represented by said first data.

12. A method for transforming data between an XML (extensible markup language) data source and an LDAP (Lightweight Directory Access Protocol) interface, comprising:
   receiving first data, said first data pertaining at least to a subset of first information received from said XML data source;
   creating an operation object using said first data; and
   transforming information associated in said operation object into second data, said second data having an LDAP format and pertaining to an LDAP operation that affects an LDAP directory coupled to receive said second data through said LDAP interface, whereby said operation object implementing both a first functionality and a second functionality, said first functionality executing said LDAP operation affecting said LDAP directory, said second functionality restoring said LDAP directory to a state that existed prior to a commencement of execution of said operation object.

13. The method of claim 12 further comprising storing state data associated with said LDAP operation in said operation object prior to executing said LDAP operation, said state data representing data to enable said second functionality to accomplish said restoring said LDAP directory to said state that existed prior to said commencement of execution of said operation object.

14. The method of claim 13 wherein said operation object represents one of an add entry object, a remove entry object, and a modify entry object.

15. The method of claim 13 wherein said first functionality represents an add entry functionality and said second functionality represents a remove entry functionality.

16. The method of claim 13 wherein said first functionality represents a remove entry functionality and said second functionality represents an add entry functionality.

17. The method of claim 13 wherein said first functionality represents a first modify entry functionality configured to modify an entry in said LDAP directory from a first state to a second state, said second functionality represents a second modify entry functionality configured to modify said entry from said second state back to said first state.

18. The method of claim 12 further comprising:
   providing a transaction engine;
   receiving third data at said transaction engine, said third data pertaining to said first information, said third data having a first XML format that is different from a second XML format associated with said first information; and
   decomposing said third data into a plurality of messages, each of said plurality of messages being associated with an LDAP atomic operation, one of said plurality of messages being said first data.

19. The method of claim 18 further comprising:
   providing an activation engine; and
   receiving said first information at said first activation engine, said activation engine being configured to transform said first information having said second XML format into said third data having said first XML format.

20. The arrangement of claim 12 wherein said XML data source represents a customer relationship management (CRM) program.

21. An apparatus for transforming data between an XML (extensible markup language) data source and an LDAP (Lightweight Directory Access Protocol) interface, comprising:
   means for receiving first data from said XML data source, said first data being represented in a first XML format; and
   means for transforming first information associated with said first data into second data, said second data being represented in an LDAP format and pertaining to an LDAP operation affecting a LDAP directory that is coupled to receive said second data through said LDAP interface,
   whereby said LDAP operation is represented by an operation object that implements both a first functionality and a second functionality, said first functionality executing said LDAP operation affecting said LDAP directory, said second functionality restoring said LDAP directory to a state that existed prior to a commencement of execution of said operation object.

22. The apparatus of claim 21 wherein said XML data source represents an LDAP directory front-end program.

23. The apparatus of claim 22 wherein said LDAP directory front-end program represents a customer relationship management (CRM) program.

24. The apparatus of claim 21 wherein said operation object represents one of an add entry object, a remove entry object, and a modify entry object.

25. The apparatus of claim 24 wherein said first functionality represents an add entry functionality and said second functionality represents a remove entry functionality.

26. The apparatus of claim 24 wherein said first functionality represents a remove entry functionality and said second functionality represents an add entry functionality.

27. The apparatus of claim 24 wherein said first functionality represents a first modify entry functionality configured to modify an entry in said LDAP directory from a first state to a second state, said second functionality represents a second modify entry functionality configured to modify said entry from said second state back to said first state.

28. The apparatus of claim 24 wherein said operation object is configured to store state data associated with said DAP operation, said state data representing data to enable said second functionality to accomplish said restoring said LDAP directory to said state that existed prior to said commencement of execution of said operation object.

29. The apparatus of claim 24 further comprising an engine for transforming said first data into third data, said third data having a second XML format different from said first XML format.

30. The apparatus of claim 29 wherein said second XML format is an LDAP-oriented XML format.

31. The apparatus of claim 30 wherein said transforming said first data into said third data employs XSLT technology.

32. The apparatus of claim 30 further comprising means for decomposing said third data into a plurality of messages, each of said plurality of messages being associated with an LDAP atomic operation, one of said plurality of messages being represented by said first information associated with said first data.

* * * * *

UNITED STATES PATENT AND TRADEMARK OFFICE
CERTIFICATE OF CORRECTION

PATENT NO.       : 7,076,488 B2
APPLICATION NO.  : 10/354488
DATED            : July 11, 2006
INVENTOR(S)      : Brooks Bollich Page 1 of 1

It is certified that error appears in the above-identified patent and that said Letters Patent is hereby corrected as shown below:

IN THE SPECIFICATION

Column 10, line 44, delete "as" and insert therefor --which--

IN THE CLAIMS

Claim 28, Column 13, line 13, delete "DAP" and insert therefor --LDAP--

Signed and Sealed this

Sixteenth Day of October, 2007

JON W. DUDAS
*Director of the United States Patent and Trademark Office*